(12) United States Patent
Yue et al.

(10) Patent No.: US 11,916,708 B2
(45) Date of Patent: Feb. 27, 2024

(54) PHASE DOMAIN MODULATION METHOD DEPENDENT ON SPATIAL POSITION

(71) Applicant: University of Electronic Science and Technology of China, Chengdu (CN)

(72) Inventors: Guangrong Yue, Chengdu (CN); Daizhong Yu, Chengdu (CN); Lin Yang, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 18/033,384

(22) PCT Filed: Apr. 29, 2021

(86) PCT No.: PCT/CN2021/090981
§ 371 (c)(1),
(2) Date: Apr. 24, 2023

(87) PCT Pub. No.: WO2022/095372
PCT Pub. Date: May 12, 2022

(65) Prior Publication Data
US 2023/0403186 A1 Dec. 14, 2023

(30) Foreign Application Priority Data
Nov. 9, 2020 (CN) .......................... 202011235645.5

(51) Int. Cl.
*H04L 27/18* (2006.01)
*H04W 56/00* (2009.01)
(52) U.S. Cl.
CPC ........... *H04L 27/18* (2013.01); *H04W 56/004* (2013.01)

(58) Field of Classification Search
CPC ..... H04L 27/18; H04L 27/20; H04L 27/2007; H04L 27/201; H04W 56/004; H04W 56/0045; H04W 56/005; H04W 56/0055
See application file for complete search history.

(56) References Cited

FOREIGN PATENT DOCUMENTS

| CN | 103701745 A | 4/2014 |
|---|---|---|
| CN | 104158778 A | 11/2014 |
| CN | 112104582 A | 12/2020 |
| CN | 112104585 A | 12/2020 |
| WO | 0008795 A1 | 2/2000 |

OTHER PUBLICATIONS

NPL (CN104158778A) used in the written opinion of PCT/CN2021/090981 discloses a pre-coding method for use in spatial modulation. (Year: 2017).*

* cited by examiner

*Primary Examiner* — Siu M Lee
(74) *Attorney, Agent, or Firm* — Bayramoglu Law Offices LLC (57) ABSTRACT

A phase domain modulation method dependent on a spatial position is provided. The method mainly includes the following steps: a transmitter and a receiver perform time synchronization to obtain a synchronization time; the transmitter performs a phase domain precoding operation on an original signal to obtain a phase domain pre-coded signal; the receiver receives the phase domain pre-coded signal, obtains a phase domain initial reception signal, and performs a phase domain matching operation on the phase domain initial reception signal to obtain an estimation of the original signal.

6 Claims, 1 Drawing Sheet

PHASE DOMAIN MODULATION METHOD DEPENDENT ON SPATIAL POSITION

CROSS REFERENCE TO THE RELATED APPLICATIONS

This application is the national phase entry of International Application No. PCT/CN2021/090981, filed on Apr. 29, 2021, which is based upon and claims priority to Chinese Patent Application No. 202011235645.5, filed on Nov. 9, 2020, the entire contents of which are incorporated herein by reference.

TECHNICAL FIELD

The present invention belongs to the technical field of telecommunications, and in particular, relates to a phase domain modulation method dependent on a spatial position.

BACKGROUND

Traditional anti-interception and anti-deception methods depend on encryption and authentication technologies above the network layer. However, with the improvement of computing power, upper-layer encryption and authentication technologies are facing severe challenges. For example, it is difficult to manage, distribute and maintain secret keys. Long secret keys cause high computing overhead and a waste of resources. The improvement of eavesdropping capability imposes great threat on the upper-layer encryption methods based on computational complexity. In order to deal with these problems, the physical-layer secure communication is proposed over the world. The security gate is moved forward, and the randomness (interference, noise, etc.) of the physical-layer is used to get rid of the dependence on the long secret keys. However, most of the existing physical-layer secure communication technologies depend on the reciprocity of a wireless channel, but the reciprocity of the channel is difficult to be strictly met. Although the existing spatial physical-layer security technologies, such as spatial beamforming and direction modulation, can get rid of the limitation of channel reciprocity, only the security performance in the angle domain can be provided. If the eavesdropper and the legitimate receiver are located at the same direction angle, no security is ensured.

SUMMARY

An objective of the present invention is to overcome the defects mentioned above, and provide a phase domain modulation method dependent on a spatial position.

The technical problems of the present invention are solved as follows:

a phase domain modulation method dependent on a spatial position is based on a transmitter, a receiver and a plurality of channel resources, where the transmitter is configured to process and transmit an original signal, the receiver is configured to recover the original signal, the channel resources are used by the transmitter and the receiver, and the channel resources include time-domain, frequency-domain, space-domain and code-domain resources.

The method of the present invention includes the following steps:

S1: performing time synchronization by the transmitter and the receiver to obtain a synchronization time;

S2: performing, by the transmitter, a phase domain pre-coding operation on the original signal to obtain a phase domain pre-coded signal, and transmitting, by the transmitter, the phase domain pre-coded signal to the receiver using the plurality of channel resources; and S3: receiving, by the receiver, the phase domain pre-coded signal to obtain a phase domain initial reception signal, and performing a phase domain matching operation on the phase domain initial reception signal to obtain an estimation of the original signal.

In S2, the phase domain precoding operation includes the following steps:

S2-1: generating, by the transmitter, a high-dimensional precoding signal $\beta(t+\Delta\tau)$ according to the synchronization time t and a transmission delay $\Delta\tau$ to the receiver:

$$\beta(t+\Delta\tau) = \begin{bmatrix} \beta_1(t+\Delta\tau) \\ \beta_2(t+\Delta\tau) \\ \vdots \\ \beta_N(t+\Delta\tau) \end{bmatrix}$$

where $\beta_j(t+\Delta\tau)$ represents the $j^{th}$ dimension of the high-dimensional precoding signal, j=1, 2, . . . , N, N represents the number of dimensions of the high-dimensional precoding signal, and N does not exceed the number of the channel resources, $$\beta_j(t+\Delta\tau) = \delta + \prod_{p=1}^{T} A_{p,n_p} \cos[2\pi(n_p - 1)\Delta f_p(t+\Delta\tau)]$$

where T represents the number of phase domain precoding layers, T≥1, 1≤p≤T, $n_p$ represents an index of the $p^{th}$ layer of phase domain precoding branches, 1≤$n_p$≤$N_p$, $N_p$ represents the number of the $p^{th}$ layer of phase domain precoding branches, $$N_1 \times N_2 \times \ldots \times N_T = N, \ n_T + \sum_{p=1}^{T-1}\left[(n_P - 1) \prod_{l=p+1}^{T} N_l\right] = j, \ \Delta f_p$$

represents a frequency increment of the $p^{th}$ layer $A_{p,n_p}$ represents an amplitude of a precoding signal on the $n_p^{th}$ branch in the $p^{th}$ layer of phase domain precoding branch, and $\delta$ is a normal number agreed by the transmitter and the receiver in advance and has a value meeting $$\delta + \prod_{p=1}^{T} A_{p,n_p} \cos[2\pi(n_p - 1)\Delta f_p((t+\Delta\tau)] > 0;$$

S2-2: performing phase domain high-dimensional mapping on a phase $\angle s_0(t)$ of the original signal to obtain a high-dimensional original phase signal $\angle s(t)$:

$$\angle s(t) = \begin{bmatrix} \angle s_1(t) \\ \angle s_2(t) \\ \vdots \\ \angle s_N(t) \end{bmatrix}, \ \sum_{j=1}^{N} \angle s_j(t) = \angle s_0(t) \bmod(2\pi)$$

where the number of dimensions of the high-dimensional original phase signal is N, $S_j(t)$ represents the $j^{th}$ dimension of the high-dimensional original signal, and mod is a remainder function; and S2-3: processing the high-dimensional original phase signal according to the high-dimensional precoding signal to obtain a phase domain pre-coded signal $\xi(t)$:

$$\xi(t) = \begin{bmatrix} \xi_1(t) \\ \xi_2(t) \\ \vdots \\ \xi_N(t) \end{bmatrix} = \begin{bmatrix} \exp[j\angle s_1(t)\beta_1(t+\Delta\tau)] \\ \exp[j\angle s_2(t)\beta_2(t+\Delta\tau)] \\ \vdots \\ \exp[j\angle s_N(t)\beta_N(t+\Delta\tau)] \end{bmatrix}$$

where $j=\sqrt{-1}$, $\xi_j(t)$ and represents the $j^{th}$ dimension of the phase domain pre-coded signal.

In S3, a specific process of the phase domain matching operation is as follows:

$$\hat{s}'_0(t) = \exp\left\{ j[\gamma_1(t) \; \gamma_2(t) \; \ldots \; \gamma_N(t)] \begin{bmatrix} \angle\hat{\xi}_1(t) \\ \angle\hat{\xi}_2(t) \\ \vdots \\ \angle\hat{\xi}_N(t) \end{bmatrix} \right\} = \exp\left[ j \sum_{j=1}^{N} \gamma_j(t) \angle \hat{\xi}_j(t) \right]$$

where $\hat{\xi}(t) = [\hat{\xi}_1(t) \; \hat{\xi}_2(t) \; \ldots \; \hat{\xi}_N(t)]^T$ represents a phase domain initial reception signal, a superscript T represents transposition, $[\angle\hat{\xi}_1(t) \; \angle\hat{\xi}_2(t) \; \ldots \; \angle\hat{\xi}_N(t)]^T$ represents a phase of the phase domain initial reception signal, $\angle$ represents a phase taking operation, $\gamma_j(t)$ represents a matched signal corresponding to $\beta_j(t+\Delta\tau)$ and has a value meeting $$\gamma_1(t)\left\{ \delta + \prod_{p=1}^{T} A_{p,n_p} \cos[2\pi(n_p-1)\Delta f_p t] \right\} = 1 \; \text{mod}(2\pi),$$

and $\hat{s}'_0(t)$ represents an estimation of the original signal.

In S2-2, the phase domain high-dimensional mapping adopts the following methods:

a first method:

$$\angle s_j(t) = \frac{1}{N} \angle s_0(t);$$

and a second method:

$$\angle s_j(t) = \frac{1}{N} \angle s_0(t) + \theta_j(t),$$

where $\theta_j(t)$ is a $j^{th}$ phase domain random offset signal and meets that $[\theta_1(t) \; \theta_2(t) \; \ldots \; \theta_N(t)]^T$ is located in a solution space of an equation $$\sum_{j=1}^{N} \theta_j(t) = 0.$$

Further, the transmitter adopts a narrow-beam antenna to be pointed to the receiver.

A phase domain modulation method dependent on a spatial position is based on a transmitter, a receiver and a plurality of channel resources, where the transmitter is configured to process and transmit an original signal, the receiver is configured to recover the original signal, the channel resources are used by the transmitter and the receiver, and the channel resources include time-domain, frequency-domain, space-domain and code-domain resources.

The method of the present invention includes the following steps:

S1: performing time synchronization by the transmitter and the receiver to obtain a synchronization time;

S2: performing, by the transmitter, a phase domain precoding operation on the original signal to obtain a phase domain pre-coded signal, performing, by the transmitter, an I/Q domain precoding operation on the phase domain pre-coded signal to obtain an I/Q domain pre-coded signal, and transmitting, by the transmitter, the I/Q domain pre-coded signal to the receiver using the channel resources; and S3: receiving, by the receiver, the I/Q domain pre-coded signal to obtain an I/Q domain initial reception signal, performing an I/Q domain matching operation on the I/Q domain initial reception signal to obtain an I/Q domain matched signal, and performing, by the receiver, a phase domain matching operation on the I/Q domain matched signal to obtain an estimation of the original signal.

In S2, the phase domain precoding operation includes the following steps:

S2-1: generating, by the transmitter, a phase domain high-dimensional precoding signal $\beta(t+\Delta\tau)$ according to the synchronization time t and a transmission delay $\Delta\tau$ to the receiver:

$$\beta(t+\Delta\tau) = \begin{bmatrix} \beta_1(t+\Delta\tau) \\ \beta_2(t+\Delta\tau) \\ \vdots \\ \beta_N(t+\Delta\tau) \end{bmatrix}$$

where $\beta_j(t+\Delta\tau)$ represents the $j^{th}$ dimension of the phase domain high-dimensional precoding signal, j= 1, 2, . . . , N, N represents the number of dimensions of the high-dimensional precoding signal, and N does not exceed the number of the channel resources, $$\beta_j(t+\Delta\tau) = \delta + \prod_{p=1}^{T} A_{p,n_p} \cos[2\pi(n_p-1)\Delta f_p(t+\Delta\tau)]$$

where T represents the number of phase domain precoding layers, $T \geq 1$, $1 \leq p \leq t$, $n_p$ represents an index of the $p^{th}$ layer of phase domain precoding branches, $1 \leq n_p \leq N_p$, $N_p$ represents the number of the $p^{th}$ layer of phase domain precoding branches, $$N_1 \times N_2 \times \ldots \times N_T = N, \; n_T + \sum_{p=1}^{T-1}\left[ (n_P - 1) \prod_{l=p+1}^{T} N_l \right] = j,$$

$\Delta f_p$ represents a frequency increment of the $p^{th}$ layer, $\Delta_{p,n_p}$ represents an amplitude of a precoding signal on the $n_p^{th}$ branch in the $p^{th}$ layer of phase domain precoding branch, and δ is a normal number agreed by the transmitter and the receiver in advance and has a value meeting $$\delta + \prod_{p=1}^{T} A_{p,n_p} \cos[2\pi(n_p - 1)\Delta f_p((t + \Delta\tau)] > 0;$$

S2-2: performing phase domain high-dimensional mapping on a phase $\angle s_0(t)$ of the original signal to obtain a high-dimensional original phase signal $\angle s(t)$:

$$\angle s(t) = \begin{bmatrix} \angle s_1(t) \\ \angle s_2(t) \\ \vdots \\ \angle s_N(t) \end{bmatrix}, \sum_{j=1}^{N} \angle s_j(t) = \angle s_0(t) \bmod(2\pi)$$

where the number of dimensions of the high-dimensional original phase signal is N, $s_j(t)$ represents the $j^{th}$ dimension of the high-dimensional original signal, and mod is a remainder function; and S2-3: processing the high-dimensional original phase signal according to the high-dimensional precoding signal to obtain a phase domain pre-coded signal $\xi(t)$:

$$\xi(t) = \begin{bmatrix} \xi_1(t) \\ \xi_2(t) \\ \vdots \\ \xi_N(t) \end{bmatrix} = \begin{bmatrix} \exp[j\angle s_1(t)\beta_1(t + \Delta\tau)] \\ \exp[j\angle s_2(t)\beta_2(t + \Delta\tau)] \\ \vdots \\ \exp[j\angle s_N(t)\beta_N(t + \Delta\tau)] \end{bmatrix}$$

where $\xi_j(t)$ represents the $j^{th}$ dimension of the phase domain pre-coded signal.

The I/Q domain precoding operation includes the following steps:

S2-4: generating, by the transmitter, an I/Q domain high-dimensional precoding signal $\alpha(t+\Delta\tau)$ according to the synchronization time t and a transmission delay $\Delta\delta$ to the receiver:

$$\alpha(t + \Delta\tau) = \begin{bmatrix} \alpha_1(t + \Delta\tau) \\ \alpha_2(t + \Delta\tau) \\ \vdots \\ \alpha_M(t + \Delta\tau) \end{bmatrix}$$

where $\alpha_1(t+\Delta\tau)$ represents the $i^{th}$ dimension of the I/Q domain high-dimensional precoding signal, i=1, 2, ..., M, M represents the number of dimensions of the high-dimensional precoding signal, and M×N does not exceed the number of the channel resources, $$\alpha_i(t + \Delta\tau) = \prod_{m=1}^{L} \exp[-j2\pi(k_m - 1)\Delta f_m(t + \Delta\tau)]$$

where $j=\sqrt{-1}$, m=1, 2, ..., L, L represents the number of I/Q domain precoding layers, L≥1, $k_m$ represents an index of the $m^{th}$ layer of I/Q domain precoding branches, 1≤$k_m$≤$M_m$, $M_m$ represents the number of the $m^{th}$ layer of I/Q domain precoding branches, $$M_1 \times M_2 \times \ldots \times M_L = M, \; k_L + \sum_{m=1}^{L-1}\left[(k_m - 1)\prod_{l=m+1}^{L} M_l\right] = i,$$

and $\Delta f_m$ represents a frequency increment of the $m^{th}$ layer; and

S2-5: performing I/Q domain high-dimensional mapping on the $j^{th}$ dimension $\xi_j(t)$ of the phase domain pre-coded signal $\xi(t)$ to obtain a $j^{th}$ high-dimensional signal $\xi_j(t)$:

$$\xi_j(t) = \begin{bmatrix} \xi_{j,1}(t) \\ \xi_{j,2}(t) \\ \vdots \\ \xi_{j,M}(t) \end{bmatrix}, \sum_{k=1}^{M} \xi_{j,k}(t) = \xi_j(t)$$

where the number of dimensions of the $j^{th}$ high-dimensional signal is M, and $\xi_{j,k}(t)$ is the $k^{th}$ dimension of the $j^{th}$ high-dimensional signal $\xi_j(t)$; and S2-6: processing the $j^{th}$ high-dimensional signal according to the I/Q domain high-dimensional precoding signal to obtain a $j^{th}$ I/Q domain pre-coded signal $x_j(t)$:

$$x_j(t) = \begin{bmatrix} x_{j,1}(t) \\ x_{j,2}(t) \\ \vdots \\ x_{j,M}(t) \end{bmatrix} = \begin{bmatrix} \xi_{j,1}(t)\alpha_1(t + \Delta\tau) \\ \xi_{j,2}(t)\alpha_2(t + \Delta\tau) \\ \vdots \\ \xi_{j,M}(t)\alpha_M(t + \Delta\tau) \end{bmatrix}$$

where $x_{j,k}(t)$ represents the $k^{th}$ dimension of the $j^{th}$ I/Q domain pre-coded signal, and combining, by the transmitter, the $j^{th}$ I/Q domain pre-coded signal into an I/Q domain pre-coded signal:

$$x(t) = \begin{bmatrix} x_1(t) \\ x_2(t) \\ \vdots \\ x_N(t) \end{bmatrix}$$

In S3, a specific process of the I/Q domain matching operation is as follows:

$$\hat{\xi}_j(t) = [\alpha_1^*(t) \; \alpha_2^*(t) \; \ldots \; \alpha_M^*(t)] \begin{bmatrix} \hat{x}_{j,1}(t) \\ \hat{x}_{j,2}(t) \\ \vdots \\ \hat{x}_{j,M}(t) \end{bmatrix} = \sum_{k=1}^{M} \alpha_k^*(t)\hat{x}_{j,k}(t)$$

$$\hat{x}(t) = \begin{bmatrix} \hat{x}_1(t) \\ \hat{x}_2(t) \\ \vdots \\ \hat{x}_M(t) \end{bmatrix}, \hat{x}_j(t) = \begin{bmatrix} \hat{x}_{j,1}(t) \\ \hat{x}_{j,2}(t) \\ \vdots \\ \hat{x}_{j,M}(t) \end{bmatrix}$$

where $\hat{x}(t)$ represents an I/Q domain initial reception signal, $$\alpha_k^*(t) = \prod_{m=1}^{L} \exp[j2\pi(k_m - 1)\Delta f_m t],$$

* represents conjugation, $\hat{\xi}_i(t)$ represents the $i^{th}$ dimension of an I/Q matched signal, and the finally obtained I/Q domain matched signal is as follows:

$$\hat{\xi}(t) = \begin{bmatrix} \hat{\xi}_1(t) \\ \hat{\xi}_2(t) \\ \vdots \\ \hat{\xi}_N(t) \end{bmatrix}$$

a specific process of the phase domain matching operation is as follows:

$$\hat{s}'_0(t) = \exp\left\{ j[\gamma_1(t)\ \gamma_2(t)\ \ldots\ \gamma_N(t)] \begin{bmatrix} \angle\hat{\xi}_1(t) \\ \angle\hat{\xi}_2(t) \\ \vdots \\ \angle\hat{\xi}_N(t) \end{bmatrix} \right\} = \exp\left[ j \sum_{j=1}^{N} \gamma_j(t) \angle\hat{\xi}_1(t) \right]$$

where $\gamma_j(t)$ represents a matched signal corresponding to $\beta_j(t+\Delta\tau)$ and has a value meeting $$\gamma_j(t)\left\{ \delta + \prod_{p=1}^{T} A_{p,n_p} \cos[2\pi(n_p-1)\Delta f_p t] \right\} = 1 \mod(2\pi),$$

and $\hat{s}'_0(t)$ represents an estimation of the original signal.

In S2-2, the phase domain high-dimensional mapping adopts the following methods:

a first method:

$$\angle s_j(t) = \frac{1}{N} \angle s_0(t);$$

and the second method:

$$\angle s_j(t) = \frac{1}{N} \angle s_0(t) + \theta_j(t),$$

where $\theta_j(t)$ is a $j^{th}$ phase domain random offset signal and meets that $[\theta_1(t)\ \theta_2(t)\ \ldots\ \theta_N(t)]^T$ is located in a solution space of an equation $$\sum_{j=1}^{N} \theta_j(t) = 0.$$

In S2-5, the I/Q domain high-dimensional mapping adopts the following methods:

a first method:

$$\xi_{j,i}(t) = \frac{1}{M} \xi_j(t);$$

and the second method:

$$\xi_{j,i}(t) = \frac{1}{M} \xi_j(t) + n_i(t),$$

where $n_i(t)$ is an $i^{th}$ I/Q domain random offset signal and meets that $[n_1(t)\ n_2(t)\ \ldots\ n_M(t)]^T$ is located in a solution space of an equation $$\sum_{i=1}^{M} n_i(t) = 0.$$

Further, the transmitter adopts a narrow-beam antenna to be pointed to the receiver.

The beneficial effects of the present invention are:

According to the phase domain signal processing method of the present invention, secure communication is achieved without reducing the power efficiency of a system. The dependence of a physical-layer secure communication system on channel state information can be overcome, and the security in the distance domain is realized, so that only the legitimate receiver at an expected distance can receive a correct signal while the receiver at other distances cannot receive the correct signal.

DETAILED DESCRIPTION OF THE EMBODIMENTS

The present invention is further described with reference to the accompanying drawings and embodiments.

Embodiment 1

This embodiment provides a phase domain modulation method dependent on a spatial position, which is based on a transmitter, a receiver and a plurality of channel resources, where the transmitter is configured to process and transmit an original signal, the receiver is configured to recover the original signal, the channel resources are used by the transmitter and the receiver, and the channel resources include time-domain, frequency-domain, space-domain and code-domain resources.

The method in this embodiment includes the following steps:

S1: time synchronization is performed by the transmitter and the receiver to obtain a synchronization time;

S2: the transmitter performs a phase domain precoding operation on the original signal to obtain a phase domain pre-coded signal, and the transmitter transmits the phase domain pre-coded signal to the receiver using the plurality of channel resources; and S3: the receiver receives the phase domain pre-coded signal to obtain a phase domain initial reception signal, and a phase domain matching operation is performed on the phase domain initial reception signal to obtain an estimation of the original signal.

In S2, the phase domain precoding operation includes the following steps:

S2-1: the transmitter generates a high-dimensional pre-coding signal $\beta(t+\Delta\tau)$ according to the synchronization time t and a transmission delay $\Delta\tau$ to the receiver:

$$\beta(t+\Delta\tau) = \begin{bmatrix} \beta_1(t+\Delta\tau) \\ \beta_2(t+\Delta\tau) \\ \vdots \\ \beta_N(t+\Delta\tau) \end{bmatrix}$$

where $\beta_j(t=\Delta\tau)$ represents the $j^{th}$ dimension of the high-dimensional precoding signal, $j=1, 2, \ldots, N$, N represents the number of dimensions of the high-dimensional precoding signal, and N does not exceed the number of the channel resources, $$\beta_j(t+\Delta\tau) = \delta + \prod_{p=1}^{T} A_{p,n_p} \cos[2\pi(n_p - 1)\Delta f_p(t+\Delta\tau)]$$

where T represents the number of phase domain precoding layers, $T \geq 1$, $1 \leq p \leq T$, $n_p$ represents an index of the $p^{th}$ layer of phase domain precoding branches, $1 \leq n_p \leq N_p$, $N_p$ represents the number of the $p^{th}$ layer of phase domain precoding branches, $$N_1 \times N_2 \times \ldots \times N_T = N, \, n_T + \sum_{p=1}^{T-1}\left[(n_p - 1)\prod_{l=p+1}^{T} N_l\right] = j,$$

$\Delta f_p$ represents a frequency increment of the $p^{th}$ layer, $A_{p,n_p}$ represents an amplitude of a precoding signal on the $n_p^{th}$ branch in the $p^{th}$ layer of phase domain precoding branch and has a value determined in advance, and $\delta$ is a normal number agreed by the transmitter and the receiver in advance and has a value meeting $$\delta + \prod_{p=1}^{T} A_{p,n_p} \cos[2\pi(n_p - 1)\Delta f_p(t+\Delta\tau)] > 0;$$

S2-2: phase domain high-dimensional mapping is performed on a phase $\angle s_0(t)$ of the original signal to obtain a high-dimensional original phase signal $\angle s(t)$:

$$\angle s(t) = \begin{bmatrix} \angle s_1(t) \\ \angle s_2(t) \\ \vdots \\ \angle s_N(t) \end{bmatrix}, \sum_{j=1}^{N} \angle s_j(t) = \angle s_0(t) \bmod(2\pi)$$

where the number of dimensions of the high-dimensional original phase signal is N, $s_j(t)$ represents the $j^{th}$ dimension of the high-dimensional original signal, and mod is a remainder function; and S2-3: the high-dimensional original phase signal is processed according to the high-dimensional precoding signal to obtain a phase domain pre-coded signal $\xi(t)$:

$$\xi(t) = \begin{bmatrix} \xi_1(t) \\ \xi_2(t) \\ \vdots \\ \xi_N(t) \end{bmatrix} = \begin{bmatrix} \exp[j\angle s_1(t)\beta_1(t+\Delta\tau)] \\ \exp[j\angle s_2(t)\beta_2(t+\Delta\tau)] \\ \vdots \\ \exp[j\angle s_N(t)\beta_N(t+\Delta\tau)] \end{bmatrix}$$

where $j=\sqrt{-1}$, and $\xi_j(t)$ represents the $j^{th}$ dimension of the phase domain pre-coded signal.

In S3, a specific process of the phase domain matching operation is as follows:

$$\hat{s}'_0(t) = \exp\left\{j[\gamma_1(t) \, \gamma_2(t) \, \ldots \, \gamma_N(t)]\begin{bmatrix} \angle\hat{\xi}_1(t) \\ \angle\hat{\xi}_2(t) \\ \vdots \\ \angle\hat{\xi}_N(t) \end{bmatrix}\right\} = \exp\left[j\sum_{j=1}^{N}\gamma_j(t)\angle\hat{\xi}_j(t)\right]$$

where $\hat{\xi}(t)=[\hat{\xi}_1(t) \, \hat{\xi}_2(t) \, \ldots \, \hat{\xi}_N(t)]^T$ represents a phase domain initial reception signal, a superscript T represents transposition, $[\angle\hat{\xi}_1(t) \, \angle\hat{\xi}_2(t) \ldots \angle\hat{\xi}_N(t)]^T$ represents a phase of the phase domain initial reception signal, $\angle$ represents a phase taking operation, $\gamma_j(t)$ represents a matched signal corresponding to $\beta_j(t+\Delta\tau)$ and has a value meeting $$\gamma_l(t)\left\{\delta + \prod_{p=1}^{T} A_{p,n_p}\cos[2\pi(n_p-1)\Delta f_p t]\right\} = 1 \bmod(2\pi),$$

and $s'_0(t)$ represents an estimation of the original signal.)

In S2-2, the phase domain high-dimensional mapping adopts the following methods:

a first method:

$$\angle s_j(t) = \frac{1}{N}\angle s_0(t);$$

and a second method:

$$\angle s_j(t) = \frac{1}{N}\angle s_0(t) + \theta_j(t),$$

where $\theta_j(t)$ is a $j^{th}$ phase domain random offset signal and meets that $[\theta_1(t) \, \theta_2(t) \, \ldots \, \theta_N(t)]^T$ is located in a solution space of an equation $$\sum_{j=1}^{N} \theta_j(t) = 0.$$

Further, the transmitter adopts a narrow-beam antenna to be pointed to the receiver.

Embodiment 2

This embodiment provides a spatial position-dependent modulation method, which is based on a transmitter, a receiver and a plurality of channel resources, where the transmitter is configured to process and transmit an original signal, the receiver is configured to recover the original signal, the channel resources are used by the transmitter and the receiver, and the channel resources include time-domain, frequency-domain, space-domain and code-domain resources.

Figure 1A:
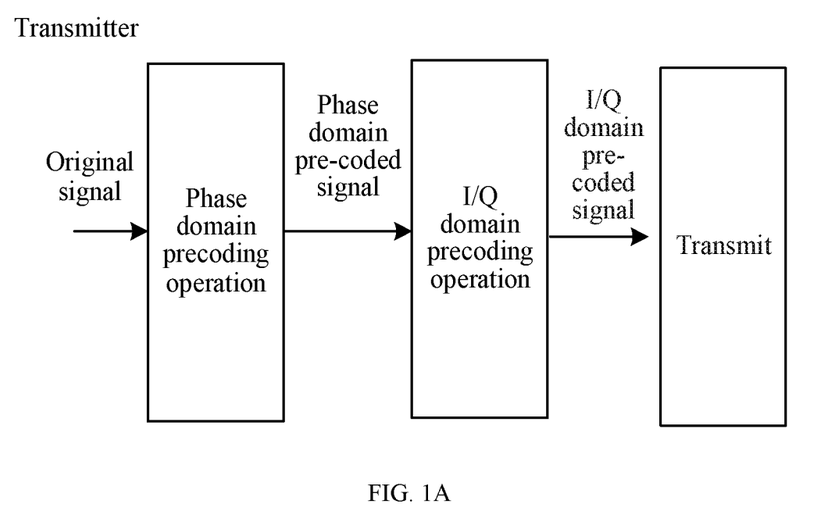
FIGS. 1A and 1B are schematic flowcharts of a method according to Embodiment 2 of the present invention.
Figure 1B:
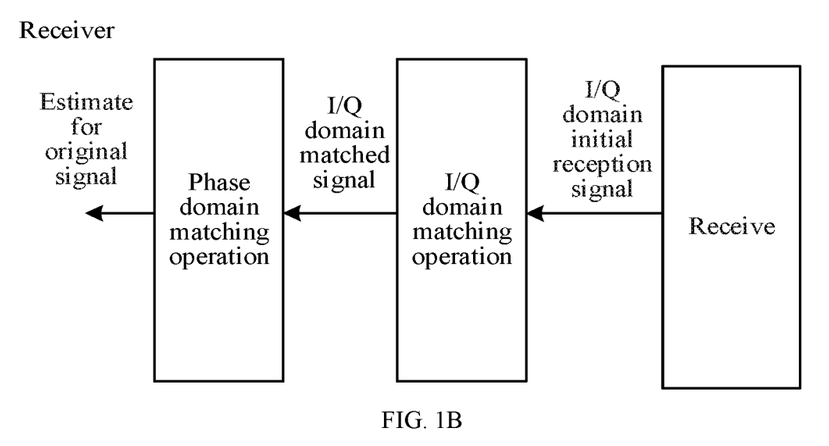

The schematic flowcharts of the method in this embodiment are shown in FIGS. 1A and 1B, including the following steps:

S1: time synchronization is performed by the transmitter and the receiver to obtain a synchronization time;

S2: the transmitter performs a phase domain precoding operation on the original signal to obtain a phase domain pre-coded signal, the transmitter performs an I/Q domain precoding operation on the phase domain pre-coded signal to obtain an I/Q domain pre-coded signal, and the transmitter transmits the I/Q domain pre-coded signal to the receiver using the channel resources; and S3: the receiver receives the I/Q domain pre-coded signal to obtain an I/Q domain initial reception signal, an I/Q domain matching operation is performed on the I/Q domain initial reception signal to obtain an I/Q domain matched signal, and the receiver performs a phase domain matching operation on the I/Q domain matched signal to obtain an estimation of the original signal.

In S2, the phase domain precoding operation includes the following steps:

S2-1: the transmitter generates a phase domain high-dimensional precoding signal $\beta(t+\Delta\tau)$ according to the synchronization time t and a transmission delay $\Delta\tau$ to the receiver:

$$\beta(t+\Delta\tau) = \begin{bmatrix} \beta_1(t+\Delta\tau) \\ \beta_2(t+\Delta\tau) \\ \vdots \\ \beta_N(t+\Delta\tau) \end{bmatrix}$$

where $\beta_j(t+\Delta\tau)$ represents the $j^{th}$ dimension of the phase domain high-dimensional precoding signal, j=1, 2, ..., N, N represents the number of dimensions of the high-dimensional precoding signal, and N does not exceed the number of the channel resources, $$\beta_j(t+\Delta\tau) = \delta + \prod_{p=1}^{T} A_{p,n_p} \cos[2\pi(n_p-1)\Delta f_p(t+\Delta\tau)]$$

where T represents the number of phase domain precoding layers, T≥1, 1≤p≤T, $n_p$ represents an index of the $p^{th}$ layer of phase domain precoding branches, $1 \leq n_p \leq N_p$, $N_p$ represents the number of the $p^{th}$ layer of phase domain precoding branches, $$N_1 \times N_2 \times ... \times N_T = N, \quad n_T + \sum_{p=1}^{T-1}\left[(n_p-1)\prod_{i=p+1}^{T} N_i\right] = j,$$

$\Delta f_p$ represents a frequency increment of the $p^{th}$ layer, $A_{p,n_p}$ represents an amplitude of a precoding signal on the $n_p^{th}$ branch in the $p^{th}$ layer of phase domain precoding branch and has a value determined in advance, and $\delta$ is a normal number agreed by the transmitter and the receiver in advance and has a value meeting $$\delta + \prod_{p=1}^{T} A_{p,n_p} \cos[2\pi(n_p-1)\Delta f_p(t+\Delta\tau)] > 0.$$

S2-2: phase domain high-dimensional mapping is performed on a phase $\angle s_0(t)$ of the original signal to obtain a high-dimensional original phase signal $\angle s(t)$:

$$\angle s(t) = \begin{bmatrix} \angle s_1(t) \\ \angle s_2(t) \\ \vdots \\ \angle s_N(t) \end{bmatrix}, \sum_{j=1}^{N} \angle s_j(t) = \angle s_0(t) \bmod(2\pi)$$

where the number of dimensions of the high-dimensional original phase signal is N, $s_j(t)$ represents the $j^{th}$ dimension of the high-dimensional original signal, and mod is a remainder function.

In S2-2, the phase domain high-dimensional mapping adopts the following methods:

a first method:

$$\angle s_j(t) = \frac{1}{N} \angle s_0(t);$$

and a second method:

$$\angle s_j(t) = \frac{1}{N} \angle s_0(t) + \theta_j(t),$$

where $\theta_j(t)$ is a $j^{th}$ phase domain random offset signal and meets that $[\theta_1(t) \; \theta_2(t) \; ... \; \theta_N(t)]^T$ is located in a solution space of an equation $$\sum_{j=1}^{N} \theta_j(t) = 0.$$

S2-3: the high-dimensional original phase signal is processed according to the high-dimensional precoding signal to obtain a phase domain pre-coded signal $\xi(t)$:

$$\xi(t) = \begin{bmatrix} \xi_1(t) \\ \xi_2(t) \\ \vdots \\ \xi_N(t) \end{bmatrix} = \begin{bmatrix} \exp[j\angle s_1(t)\beta_1(t+\Delta\tau)] \\ \exp[j\angle s_2(t)\beta_2(t+\Delta\tau)] \\ \vdots \\ \exp[j\angle s_N(t)\beta_N(t+\Delta\tau)] \end{bmatrix}$$

where $\xi_j(t)$ represents the $j^{th}$ dimension of the phase domain pre-coded signal.

The I/Q domain precoding operation includes the following steps:

S2-4: the transmitter generates an I/Q domain high-dimensional precoding signal $\alpha(t+\Delta\tau)$ according to the synchronization time t and a transmission delay $\Delta\tau$ to the receiver:

$$\alpha(t+\Delta\tau) = \begin{bmatrix} \alpha_1(t+\Delta\tau) \\ \alpha_2(t+\Delta\tau) \\ \vdots \\ \alpha_M(t+\Delta\tau) \end{bmatrix}$$

where $\alpha_i(t+\Delta\tau)$ a represents the $i^{th}$ dimension of the I/Q domain high-dimensional precoding signal, i= 1, 2, ..., M, M represents the number of dimensions of the high-dimensional precoding signal, and M×N does not exceed the number of the channel resources, $$\alpha_i(t+\Delta\tau) = \prod_{m=1}^{L}\exp[-j2\pi(k_m-1)\Delta f_m(t+\Delta\tau)]$$

where $j=\sqrt{-1}$, m=1, 2, ..., L, L represents the number of I/Q domain precoding layers, L≥1, $k_m$ represents an index of the $m^{th}$ layer of I/Q domain precoding branches, $1 \leq k_m \leq M_m$, $M_m$ represents the number of the $m^{th}$ layer of I/Q domain precoding branches, $$M_1 \times M_2 \times ... \times M_L = M, \quad k_L + \sum_{m=1}^{L-1}\left[(k_m-1)\prod_{l=m+1}^{L}M_l\right] = i,$$

and $\Delta f_m$ represents a frequency increment of the $m^{th}$ layer.

S2-5: I/Q domain high-dimensional mapping is performed on the $j^{th}$ dimension of $\xi_j(t)$ of the phase domain pre-coded signal $\xi(t)$ to obtain a $j^{th}$ high-dimensional signal $\xi_j(t)$:

$$\xi_j(t) = \begin{bmatrix} \xi_{j,1}(t) \\ \xi_{j,2}(t) \\ \vdots \\ \xi_{j,M}(t) \end{bmatrix}, \quad \sum_{k=1}^{M}\xi_{j,k}(t) = \xi_j(t)$$

where the number of dimensions of the $j^{th}$ high-dimensional signal is M, and $\xi_{j,k}(t)$ is the $k^{th}$ dimension of the $j^{th}$ high-dimensional signal $\xi_j(t)$.

In S2-5, the I/Q domain high-dimensional mapping adopts the following methods:

a first method:

$$\xi_{j,i}(t) = \frac{1}{M}\xi_j(t);$$

and a second method:

$$\xi_{j,i}(t) = \frac{1}{M}\xi_j(t) + n_i(t),$$

where $n_i(t)$ is an $i^{th}$ I/Q domain random offset signal and meets that $[n_1(t)\ n_2(t)\ ...\ n_M(t)]^T$ is located in a solution space of an equation $$\sum_{i=1}^{M}n_i(t) = 0.$$

S2-6: the $j^{th}$ high-dimensional signal is processed according to the I/Q domain high-dimensional precoding signal to obtain a $j^{th}$ I/Q domain pre-coded signal $x_j(t)$:

$$x_j(t) = \begin{bmatrix} x_{j,1}(t) \\ x_{j,2}(t) \\ \vdots \\ x_{j,M}(t) \end{bmatrix} = \begin{bmatrix} \xi_{j,1}(t)\alpha_1(t+\Delta\tau) \\ \xi_{j,2}(t)\alpha_2(t+\Delta\tau) \\ \vdots \\ \xi_{j,M}(t)\alpha_M(t+\Delta\tau) \end{bmatrix}$$

where $x_{j,k}(t)$ represents the $k^{th}$ dimension of the $j^{th}$ I/Q domain pre-coded signal; and the transmitter combines the $j^{th}$ I/Q domain pre-coded signal into an I/Q domain pre-coded signal:

$$x(t) = \begin{bmatrix} x_1(t) \\ x_2(t) \\ \vdots \\ x_N(t) \end{bmatrix}$$

In S3, a specific process of the I/Q domain matching operation is as follows:

$$\hat{\xi}_j(t) = [\alpha_1^*(t)\ \alpha_2^*(t)\ ...\ \alpha_M^*(t)]\begin{bmatrix} \hat{x}_{j,1}(t) \\ \hat{x}_{j,2}(t) \\ \vdots \\ \hat{x}_{j,M}(t) \end{bmatrix} = \sum_{k=1}^{M}\alpha_k^*(t)\hat{x}_{j,k}(t)$$

$$\hat{x}(t) = \begin{bmatrix} \hat{x}_1(t) \\ \hat{x}_2(t) \\ \vdots \\ \hat{x}_N(t) \end{bmatrix}, \quad \hat{x}_j(t) = \begin{bmatrix} \hat{x}_{j,1}(t) \\ \hat{x}_{j,2}(t) \\ \vdots \\ \hat{x}_{j,M}(t) \end{bmatrix}$$

where $\hat{x}(t)$ represents an I/Q domain initial reception signal, $$\alpha_k^*(t) = \prod_{m=1}^{L}\exp[j2\pi(k_m-1)\Delta f_m t],$$

\* represents conjugation, $\hat{\xi}_i(t)$ represents the $i^{th}$ dimension of an I/Q matched signal, and the finally obtained I/Q domain matched signal is as follows:

$$\hat{\xi}(t) = \begin{bmatrix} \hat{\xi}_1(t) \\ \hat{\xi}_2(t) \\ \vdots \\ \hat{\xi}_N(t) \end{bmatrix}.$$

A specific process of the phase domain matching operation is as follows:

$$\hat{s}_0'(t) = \exp\left\{j[\gamma_1(t)\ \gamma_2(t)\ ...\ \gamma_N(t)]\begin{bmatrix} L\hat{\xi}_1(t) \\ L\hat{\xi}_2(t) \\ \vdots \\ L\hat{\xi}_N(t) \end{bmatrix}\right\} = \exp\left[j\sum_{j=1}^{N}\gamma_j(t)L\hat{\xi}_j(t)\right]$$

where $\gamma j(t)$ represents a matched signal corresponding to $\beta_j(t+\Delta\tau)$ and has a value meeting $$\gamma_j(t)\left\{\delta + \prod_{p=1}^{T}A_{p,n_p}\cos[2\pi(n_p-1)\Delta f_p t]\right\} = 1\ \mathrm{mod}(2\pi),$$

and $\hat{s}'_0(t)$ represents an estimation of the original signal.

Further, the transmitter adopts a narrow-beam antenna to be pointed to the receiver.

What is claimed is:

1. A phase domain modulation method dependent on a spatial position, based on a transmitter, a receiver and a plurality of channel resources, wherein the transmitter is configured to process and transmit an original signal, the receiver is configured to recover the original signal, the channel resources are used by the transmitter and the receiver, the channel resources comprise time-domain, frequency-domain, space-domain and code-domain resources, and the method comprises the following steps:

S1: performing a time synchronization by the transmitter and the receiver to obtain a synchronization time;

S2: performing by the transmitter, a phase domain precoding operation on the original signal to obtain a phase domain pre-coded signal, and transmitting, by the transmitter, the phase domain pre-coded signal to the receiver using the plurality of channel resources;

the phase domain precoding operation comprises the following steps:

S2-1: generating, by the transmitter, a high-dimensional precoding signal $\beta(t+\Delta\tau)$ according to the synchronization time t and a transmission delay $\Delta\tau$ to the receiver:

$$\beta(t+\Delta\tau) = \begin{bmatrix} \beta_1(t+\Delta\tau) \\ \beta_2(t+\Delta\tau) \\ \vdots \\ \beta_N(t+\Delta\tau) \end{bmatrix}$$

wherein $\beta_j(t+\Delta\tau)$ represents a $j^{th}$ dimension of the high-dimensional precoding signal, j=1, 2, ..., N, N represents a number of dimensions of the high-dimensional precoding signal, and N does not exceed a number of the channel resources, $$\beta_j(t+\Delta\tau) = \delta + \prod_{p=1}^{T} A_{p,n_p} \cos[2\pi(n_p-1)\Delta f_p(t+\Delta\tau)]$$

wherein T represents a number of phase domain precoding layers, $T \geq 1$, $1 \leq p \leq T$, $n_p$ represents an index of a $p^{th}$ layer of phase domain precoding branches, $1 \leq n_p \leq N_p$, $N_p$ represents a number of the $p^{th}$ layer of phase domain precoding branches, $$N_1 \times N_2 \times \ldots \times N_T = N, \quad n_T + \sum_{p=1}^{T-1}\left[(n_p-1)\prod_{i=p+1}^{T} N_i\right] = j,$$

$\Delta f_p$ represents a frequency increment of the $p^{th}$ layer, $A_{p,n_p}$ represents an amplitude of a precoding signal on a $n_p^{th}$ branch in the $p^{th}$ layer of phase domain precoding branch, and $\delta$ is a normal number agreed by the transmitter and the receiver in advance and has a value meeting $$\delta + \prod_{p=1}^{T} A_{p,n_p} \cos[2\pi(n_p-1)\Delta f_p(t+\Delta\tau)] > 0;$$

S2-2: performing phase domain high-dimensional mapping on a phase $\angle s_0(t)$ of the original signal to obtain a high-dimensional original phase signal $\angle s(t)$:

$$\angle s(t) = \begin{bmatrix} \angle s_1(t) \\ \angle s_2(t) \\ \vdots \\ \angle s_N(t) \end{bmatrix}, \sum_{j=1}^{N} \angle s_j(t) = \angle s_0(t) \bmod(2\pi)$$

wherein a number of dimensions of the high-dimensional original phase signal is N, $s_j(t)$ represents a $j^{th}$ dimension of the high-dimensional original signal, and mod is a remainder function; and S2-3: processing the high-dimensional original phase signal according to the high-dimensional precoding signal to obtain a phase domain pre-coded signal $\xi(t)$:

$$\xi(t) = \begin{bmatrix} \xi_1(t) \\ \xi_2(t) \\ \vdots \\ \xi_N(t) \end{bmatrix} = \begin{bmatrix} \exp[j' \angle s_1(t)\beta_1(t+\Delta\tau)] \\ \exp[j' \angle s_2(t)\beta_2(t+\Delta\tau)] \\ \vdots \\ \exp[j' \angle s_N(t)\beta_N(t+\Delta\tau)] \end{bmatrix}$$

wherein $j' = \sqrt{-1}$, and $\xi_j(t)$ represents a $j^{th}$ dimension of the phase domain pre-coded signal; and S3: receiving, by the receiver, the phase domain pre-coded signal to obtain a phase domain initial reception signal, and performing a phase domain matching operation on the phase domain initial reception signal to obtain an estimation of the original signal;

a specific process of the phase domain matching operation is as follows:

$$\hat{s}'_0(t) = \exp\left\{j'[\gamma_1(t) \ \gamma_2(t) \ \ldots \ \gamma_N(t)] \begin{bmatrix} \angle \hat{\xi}_1(t) \\ \angle \hat{\xi}_2(t) \\ \vdots \\ \angle \hat{\xi}_N(t) \end{bmatrix}\right\} = \exp\left[j' \sum_{j=1}^{N} \gamma_j(t) \angle \hat{\xi}_j(t)\right]$$

wherein $\hat{\xi}(t) = [\hat{\xi}_1(t) \ \hat{\xi}_2(t) \ \ldots \ \hat{\xi}_N(t)]^T$ represents a phase domain initial reception signal, a superscript T represents transposition, $[\angle \hat{\xi}_1(t) \ \angle \hat{\xi}_2(t) \ \ldots \ \angle \hat{\xi}_N(t)]^T$ represents a phase of the phase domain initial reception signal, $\angle$ represents a phase taking operation, $\gamma_j(t)$ represents a matched signal corresponding to $\beta_j(t+\Delta\tau)$ and has a value meeting $$\gamma_j(t)\left\{\delta + \prod_{p=1}^{T} A_{p,n_p} \cos[2\pi(n_p-1)\Delta f_p t]\right\} = 1 \bmod(2\pi),$$

and $\hat{s}'_0(t)$ represents an estimation of the original signal.

2. The phase domain modulation method dependent on the spatial position according to claim 1, wherein in S2-2, the phase domain high-dimensional mapping adopts the following methods:

a first method:

$$\angle s_j(t) = \frac{1}{N} \angle s_0(t);$$

and
a second method:

$$\angle s_j(t) = \frac{1}{N}\angle s_0(t) + \theta_j(t),$$

wherein $\theta_j(t)$ is a $j^{th}$ phase domain random offset signal and meets that $[\theta_1(t)\ \theta_2(t)\ \ldots\ \theta_N(t)]^T$ is located in a solution space of an equation $$\sum_{j=1}^{N}\theta_j(t) = 0.$$

3. The phase domain modulation method dependent on the spatial position according to claim 1, wherein the transmitter adopts a narrow-beam antenna to be pointed to the receiver.

4. A spatial position-dependent modulation method, based on a transmitter, a receiver and a plurality of channel resources, wherein the transmitter is configured to process and transmit an original signal, the receiver is configured to recover the original signal, the channel resources are used by the transmitter and the receiver, the channel resources comprise time-domain, frequency-domain, space-domain and code-domain resources, and the method comprises the following steps:
S1: performing a time synchronization by the transmitter and the receiver to obtain a synchronization time;
S2: performing, by the transmitter, a phase domain precoding operation on the original signal to obtain a phase domain pre-coded signal, performing, by the transmitter, an I/Q domain precoding operation on the phase domain pre-coded signal to obtain an I/Q domain pre-coded signal, and transmitting, by the transmitter, the I/Q domain pre-coded signal to the receiver using the channel resources;
the phase domain precoding operation comprises the following steps:
S2-1: generating, by the transmitter, a phase domain high-dimensional precoding signal $\beta(t+\Delta\tau)$ according to the synchronization time t and a transmission delay $\Delta\tau$ to the receiver:

$$\beta(t+\Delta\tau) = \begin{bmatrix} \beta_1(t+\Delta\tau) \\ \beta_2(t+\Delta\tau) \\ \vdots \\ \beta_N(t+\Delta\tau) \end{bmatrix}$$

wherein $\beta_j(t+\Delta\tau)$ represents a $j^{th}$ dimension of the phase domain high-dimensional precoding signal, $j=1, 2, \ldots, N$, N represents a number of dimensions of the high-dimensional precoding signal, and N does not exceed a number of the channel resources, $$\beta_j(t+\Delta\tau) = \delta + \prod_{p=1}^{T}A_{p,n_p}\cos[2\pi(n_p-1)\Delta f_p(t+\Delta\tau)]$$

wherein T represents a number of phase domain precoding layers, $T\geq 1$, $1\leq p\leq T$, $n_p$ represents an index of a $p^{th}$ layer of phase domain precoding branches, $1\leq n_p\leq N_p$, $N_p$ represents a number of the $p^{th}$ layer of phase domain precoding branches, $$N_1 \times N_2 \times \ldots \times N_T = N,\ n_T + \sum_{p=1}^{T-1}\left[(n_p-1)\prod_{i=p+1}^{T}N_i\right] = j,$$

$\Delta f_p$ represents a frequency increment of the $p^{th}$ layer, $A_{p,n_p}$ represents an amplitude of a precoding signal on a $n_p^{th}$ branch in the $p^{th}$ layer of phase domain precoding branch, and $\delta$ is a normal number agreed by the transmitter and the receiver in advance and has a value meeting $$\delta + \prod_{p=1}^{T}A_{p,n_p}\cos[2\pi(n_p-1)\Delta f_p(t+\Delta\tau)] > 0;$$

S2-2: performing phase domain high-dimensional mapping on a phase $\angle s_0(t)$ of the original signal to obtain a high-dimensional original phase signal $\angle s(t)$:

$$\angle s(t) = \begin{bmatrix} \angle s_1(t) \\ \angle s_2(t) \\ \vdots \\ \angle s_N(t) \end{bmatrix},\ \sum_{j=1}^{N}\angle s_j(t) = \angle s_0(t)\mathrm{mod}(2\pi)$$

wherein a number of dimensions of the high-dimensional original phase signal is N, $s_j(t)$ represents a $j^{th}$ dimension of the high-dimensional original signal, and mod is a remainder function; and S2-3: processing the high-dimensional original phase signal according to the high-dimensional precoding signal to obtain a phase domain pre-coded signal $\xi(t)$:

$$\xi(t) = \begin{bmatrix} \xi_1(t) \\ \xi_2(t) \\ \vdots \\ \xi_N(t) \end{bmatrix} = \begin{bmatrix} \exp[j'\angle s_1(t)\beta_1(t+\Delta\tau)] \\ \exp[j'\angle s_2(t)\beta_2(t+\Delta\tau)] \\ \vdots \\ \exp[j'\angle s_N(t)\beta_N(t+\Delta\tau)] \end{bmatrix}$$

wherein $j'=\sqrt{-1}$, and $\xi_j(t)$ represents a $j^{th}$ dimension of the phase domain pre-coded signal; and the I/Q domain precoding operation comprises the following steps:

S2-4: generating, by the transmitter, an I/Q domain high-dimensional precoding signal $\alpha(t+\Delta\tau)$ according to the synchronization time t and a transmission delay $\Delta\tau$ to the receiver:

$$\alpha(t+\Delta\tau) = \begin{bmatrix} \alpha_1(t+\Delta\tau) \\ \alpha_2(t+\Delta\tau) \\ \vdots \\ \alpha_M(t+\Delta\tau) \end{bmatrix}$$

wherein $\alpha_i(t+\Delta\tau)$ represents an $i^{th}$ dimension of the I/Q domain high-dimensional precoding signal, $i=1, 2, \ldots, M$, M represents the number of dimensions of the high-dimensional precoding signal, and M×N does not exceed the number of the channel resources, $$\alpha_i(t + \Delta\tau) = \prod_{m=1}^{L} \exp[-j2\pi(k_m - 1)\Delta f_m(t + \Delta\tau)]$$

wherein m=1, 2, ..., L, L represents a number of I/Q domain precoding layers, L≥1, $k_m$ represents an index of an $m^{th}$ layer of I/Q domain precoding branches, $1 \leq k_m \leq M_m$, $M_m$ represents a number of the $m^{th}$ layer of I/Q domain precoding branches, $$M_1 \times M_2 \times \ldots \times M_L = M, \; k_L + \sum_{m=1}^{L-1}\left[(k_m - 1)\prod_{l=m+1}^{L} M_l\right] = i,$$

and $\Delta f_m$ represents a frequency increment of the $m^{th}$ layer; and

S2-5: performing I/Q domain high-dimensional mapping on the $j^{th}$ dimension $\xi_j(t)$ of the phase domain pre-coded signal $\xi(t)$ to obtain a $j^{th}$ high-dimensional signal $\xi_j(t)$:

$$\xi_j(t) = \begin{bmatrix} \xi_{j,1}(t) \\ \xi_{j,2}(t) \\ \vdots \\ \xi_{j,M}(t) \end{bmatrix}, \; \sum_{k=1}^{M} \xi_{j,k}(t) = \xi_j(t)$$

wherein a number of dimensions of the $j^{th}$ high-dimensional signal is M, and $\xi_{j,k}(t)$ is a $k^{th}$ dimension of the $j^{th}$ high-dimensional signal $\xi_j(t)$; and S2-6: processing the $j^{th}$ high-dimensional signal according to the I/Q domain high-dimensional precoding signal to obtain a $j^{th}$ I/Q domain pre-coded signal $x_j(t)$:

$$X_j(t) = \begin{bmatrix} x_{j,1}(t) \\ x_{j,2}(t) \\ \vdots \\ x_{j,M}(t) \end{bmatrix} = \begin{bmatrix} \xi_{j,1}(t)\alpha_1(t + \Delta\tau) \\ \xi_{j,2}(t)\alpha_2(t + \Delta\tau) \\ \vdots \\ \xi_{j,M}(t)\alpha_M(t + \Delta\tau) \end{bmatrix}$$

wherein $x_{j,k}(t)$ represents a $k^{th}$ dimension of the $j^{th}$ I/Q domain pre-coded signal, and combining, by the transmitter, the $j^{th}$ I/Q domain pre-coded signal into an I/Q domain pre-coded signal:

$$x(t) = \begin{bmatrix} x_1(t) \\ x_2(t) \\ \vdots \\ x_N(t) \end{bmatrix};$$

and

S3: receiving, by the receiver, the I/Q domain pre-coded signal to obtain an I/Q domain initial reception signal, performing an I/Q domain matching operation on the I/Q domain initial reception signal to obtain an I/Q domain matched signal, and performing, by the receiver, a phase domain matching operation on the I/Q domain matched signal to obtain an estimation of the original signal;

a specific process of the I/Q domain matching operation is as follows:

$$\xi_j(t) = [\alpha_1^*(t) \; \alpha_2^*(t) \; \ldots \; \alpha_M^*(t)] \begin{bmatrix} \hat{x}_{j,1}(t) \\ \hat{x}_{j,2}(t) \\ \vdots \\ \hat{x}_{j,M}(t) \end{bmatrix} = \sum_{k=1}^{M} \alpha_k^*(t)\hat{x}_{j,k}(t)$$

wherein $\hat{x}(t)$ represents an I/Q domain initial reception signal, $$\alpha_k^*(t) = \prod_{m=1}^{L} \exp[j'2\pi(k_m - 1)\Delta f_m t],$$

* represents conjugation, $\hat{\xi}_i(t)$ represents an $i^{th}$ dimension of an I/Q matched signal, and the finally obtained I/Q domain matched signal is as follows:

$$\hat{\xi}(t) = \begin{bmatrix} \hat{\xi}_1(t) \\ \hat{\xi}_2(t) \\ \vdots \\ \hat{\xi}_N(t) \end{bmatrix}$$

a specific process of the phase domain matching operation is as follows:

$$\hat{s}_0'(t) = \exp\left\{j'[\gamma_1(t) \; \gamma_2(t) \; \ldots \; \gamma_N(t)] \begin{bmatrix} L\hat{\xi}_1(t) \\ L\hat{\xi}_2(t) \\ \vdots \\ L\hat{\xi}_X(t) \end{bmatrix}\right\} = \exp\left[j'\sum_{j=1}^{N}\gamma_j(t)L\hat{\xi}_j(t)\right]$$

wherein $\gamma_j(t)$ represents a matched signal corresponding to $\beta_j(t+\Delta\tau)$ and has a value meeting $$\gamma_i(t)\left\{\delta + \prod_{p=1}^{T} A_{p,n_p}\cos[2\pi(n_p - 1)\Delta f_p t]\right\} = 1 \bmod (2\pi),$$

and $\hat{s}'_0(t)$ represents an estimation of the original signal.

5. The spatial position-dependent modulation method according to claim 4, wherein in S2-2, the phase domain high-dimensional mapping adopts the following methods:

a first method:

$$L s_j(t) = \frac{1}{N} L s_0(t);$$

and a second method:

$$L s_j(t) = \frac{1}{N} L s_0(t) + \theta_j(t),$$

wherein is $\theta_j(t)$ is a $j^{th}$ phase domain random offset signal and meets that $[\theta_1(t) \; \theta_2(t) \ldots \theta_N(t)]^T$ is located in a solution space of an equation $$\sum_{j=1}^{N}\theta_j(t)=0.$$

6. The spatial position-dependent modulation method according to claim 4, wherein in S2-5, the I/Q domain high-dimensional mapping adopts the following methods:
a first method:

$$\xi_{j,i}(t)=\frac{1}{M}\xi_j(t);$$

and
a second method:

$$\xi_{j,i}(t)=\frac{1}{M}\xi_j(t)+n_i(t),$$

wherein $n_i(t)$ is an $i^{th}$ I/Q domain random offset signal and meets that $[n_1(t)\ n_2(t)\ \ldots\ n_M(t)]^T$ is located in a solution space of an equation $$\sum_{i=1}^{N}n_i(t)=0.$$

* * * * *